United States Patent
Bosscher et al.

(10) Patent No.: US 11,143,379 B2
(45) Date of Patent: Oct. 12, 2021

(54) METHOD AND APPARATUS TO IMPROVE THE HOMOGENEITY OF AN EDGE-LIGHT

(71) Applicant: HELLA GmbH & Co. KGaA, Lippstadt (DE)

(72) Inventors: Tiffany Bosscher, Farmington Hills, MI (US); Jose Miguel Mercado Pena, Canton, MI (US)

(73) Assignee: HELLA GmbH & Co. KGaA, Lippstadt (DE)

( * ) Notice: Subject to any disclaimer, the term of this patent is extended or adjusted under 35 U.S.C. 154(b) by 76 days.

(21) Appl. No.: 16/604,624

(22) PCT Filed: Apr. 9, 2018

(86) PCT No.: PCT/EP2018/058994
§ 371 (c)(1),
(2) Date: Oct. 11, 2019

(87) PCT Pub. No.: WO2018/189086
PCT Pub. Date: Oct. 18, 2018

(65) Prior Publication Data
US 2021/0116097 A1 Apr. 22, 2021

Related U.S. Application Data

(60) Provisional application No. 62/485,627, filed on Apr. 14, 2017.

(51) Int. Cl.
*F21V 8/00* (2006.01)
*F21S 43/239* (2018.01)
(Continued)

(52) U.S. Cl.
CPC .......... *F21S 43/239* (2018.01); *B60Q 1/0011* (2013.01); *B60Q 3/62* (2017.02);
(Continued)

(58) Field of Classification Search
CPC ......... B60Q 1/0011; B60Q 3/62; F21S 41/24; F21S 43/239; F21S 43/243; G02B 6/0008;
(Continued)

(56) References Cited

U.S. PATENT DOCUMENTS

| 6,356,394 B1 * | 3/2002 | Glienicke | B60Q 3/64 |
| | | | 359/641 |
| 10,180,522 B2 * | 1/2019 | Wolfing | G02B 6/0016 |

(Continued)

FOREIGN PATENT DOCUMENTS

| DE | 102012211284 A1 | 1/2014 |
| DE | 102013212906 A1 | 7/2014 |

(Continued)

OTHER PUBLICATIONS

International Search Report and Written Opinion in corresponding International application No. PCT/EP2018/058994 (filed Apr. 9, 2018) search conducted on May 31, 2018.

*Primary Examiner* — Keith G. Delahoussaye
(74) *Attorney, Agent, or Firm* — Warner Norcross + Judd LLP (57) ABSTRACT

A light blade body for a lighting device, for example for an automotive vehicle, includes an in-coupling portion configured to be optically coupled to and collect light from a light source, a propagating portion extending along a longitudinal axis between a proximal end and a distal end where the propagating portion is configured to receive light from the in-coupling portion at the proximal end and guide light to the distal end, and wherein the propagating portion includes mixing optics to mix the light in advance of reaching an out-coupling portion. The body includes the out-coupling portion proximate the distal end of the propagating portion and is configured to emit light.

11 Claims, 10 Drawing Sheets

(51) Int. Cl.
  *B60Q 3/62* (2017.01)
  *F21S 41/24* (2018.01)
  *F21S 43/249* (2018.01)
  *F21S 43/243* (2018.01)
  *B60Q 1/00* (2006.01)

(52) U.S. Cl.
  CPC ............. *F21S 41/24* (2018.01); *F21S 43/243* (2018.01); *F21S 43/249* (2018.01); *G02B 6/0028* (2013.01); *G02B 6/0031* (2013.01); *G02B 6/0036* (2013.01); *G02B 6/0038* (2013.01); *G02B 6/0043* (2013.01); *G02B 6/0008* (2013.01)

(58) Field of Classification Search
  CPC ... G02B 6/0028; G02B 6/0036; G02B 6/0043
  See application file for complete search history.

(56) References Cited

U.S. PATENT DOCUMENTS

| | | | |
|---|---|---|---|
| 2006/0067090 A1* | 3/2006 | Lee | G02B 6/4214 362/615 |
| 2006/0203486 A1* | 9/2006 | Lee | G02B 6/0018 362/244 |
| 2009/0201698 A1* | 8/2009 | Klick | G02B 6/002 362/555 |
| 2012/0250308 A1 | 10/2012 | Zwak et al. | |
| 2014/0146554 A1 | 5/2014 | Giraud | |
| 2016/0138772 A1* | 5/2016 | Sato | G02B 6/003 362/511 |
| 2020/0002224 A1* | 1/2020 | Carleton | G02B 6/0065 |

FOREIGN PATENT DOCUMENTS

| | | |
|---|---|---|
| EP | 2378187 A1 | 10/2011 |
| EP | 2927571 A1 | 10/2015 |

* cited by examiner

METHOD AND APPARATUS TO IMPROVE THE HOMOGENEITY OF AN EDGE-LIGHT

CROSS-REFERENCE TO RELATED APPLICATIONS

This application claims the benefit of U.S. provisional application No. 62/485,627, filed 14 Apr. 2017 (the '627 application), which '627 application is hereby incorporated by reference as though fully set forth herein.

BACKGROUND a. Technical Field

The instant disclosure relates generally to a lighting device, and more particularly to a lighting device for an automotive vehicle having improved light homogeneity.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Many original equipment manufacturers (OEMs) have homogeneity requirements for signal lighting to meet styling expectations or to execute a signature look for their product. Lighting applications such as light-blades/edge-lights allow innovative styling approaches as well as function. The blades are capable of meeting the performance required by regulations but often fall short of customer homogeneity expectations due to cost or packaging limitations.

In order to meet the homogeneity requirements of our customers, very long sections of light-blades/edge-lights are required to mix the light before it exits an out-coupling surface, or additional LEDs/light sources are used beyond what is photometrically needed to meet legal requirements. These solutions can be limited by available packaging space or cost.

Other solutions include the use of extra elements such as lenses or films, graining processes on the out-coupling surface, or the use of light diffusing materials, such as DF23, which increase the cost and complexity of the final devices. It would be desirable to provide increased homogeneity without the use of extra elements or use of light diffusing materials.

The foregoing discussion is intended only to illustrate the present field and should not be taken as a disavowal of claim scope.

SUMMARY

In an embodiment, a lighting device is provided that includes a light source and a light blade body that includes an in-coupling portion, a propagating portion, and an out-coupling portion. The light source is configured to output source light beams. The in-coupling portion is optically proximate the light source and is configured to collect and guide the source light beams as first light beams generally in a first direction along a longitudinal axis. The propagating portion extends along the longitudinal axis between a proximal end and a distal end. The propagating portion is configured to receive the first light beams from the in-coupling portion at the proximal end. The propagating portion includes mixing optics configured to increase dispersion of the first light beams to produce second, mixed light beams. The propagating portion is further configured to guide the second, mixed light beams to the distal end of the propagating portion. The out-coupling portion is proximate the distal end of the propagating portion and is configured to receive the second, mixed light beams and to emit the second, mixed light beams in the first direction.

Achieving a homogeneous light distribution is relatively difficult and normally requires using more light sources than needed to meet light intensity targets, using more costly light diffusing materials, or altering the configuration of the lighting device (e.g., making an edge light longer), which can require more material(s) and/or space that is not always possible with cost and packaging specifications. Embodiments consistent with the instant disclosure employ light mixing optics earlier in the light propagation path (e.g., in the light propagation portion) to thereby create a more homogenous light distribution without additional light sources, material, or packaging space.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

The instant disclosure, in embodiments, shows a lighting device (e.g., a light-blade/edge-light) which allows for improved homogeneity of the light distribution in a smaller packaging space, and without the need for additional optics/graining on the out-coupling surface.

Figures 1, 2, 3, 4:
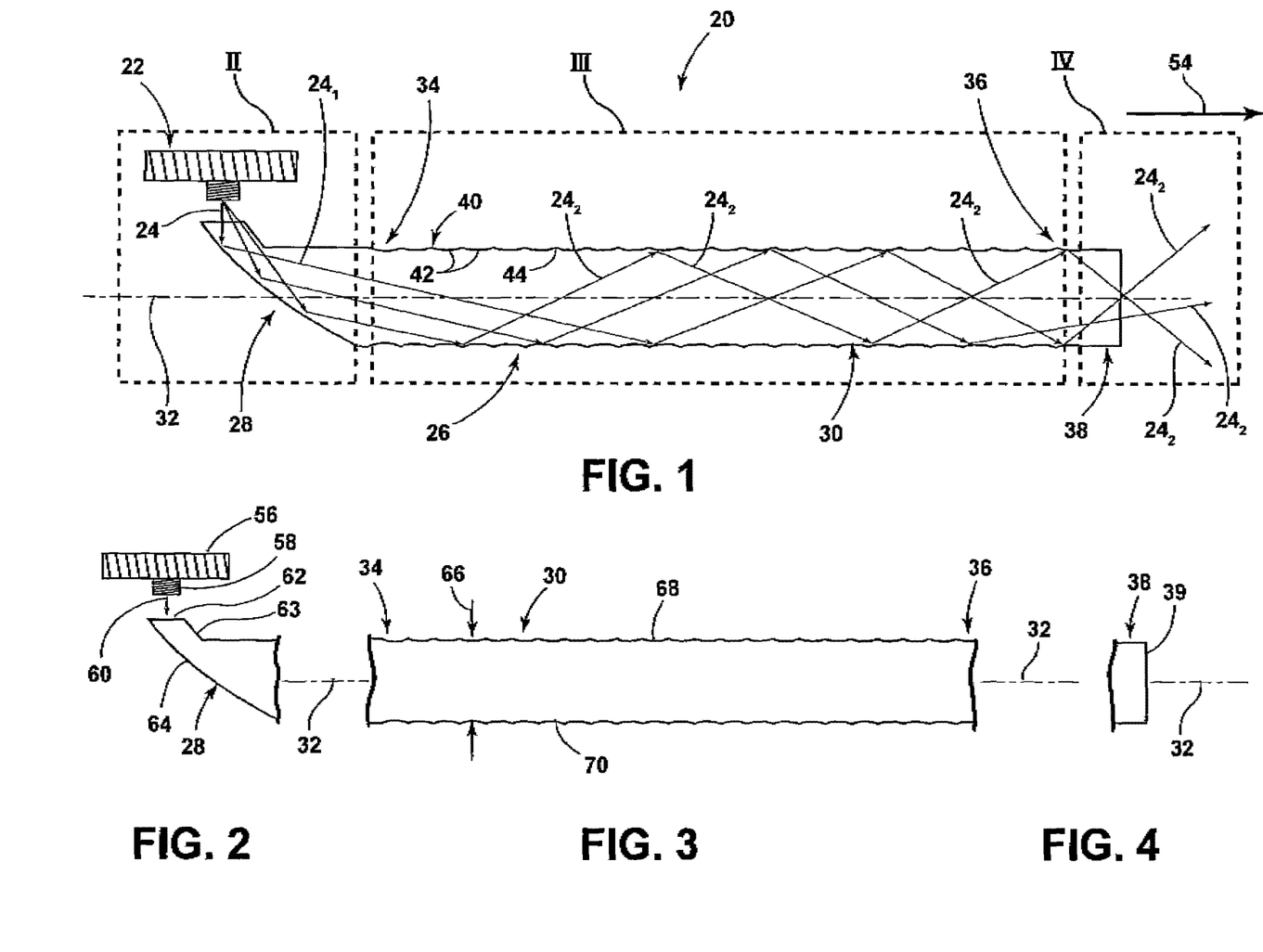
FIG. 1 is a diagrammatic view of a lighting device in accordance with an embodiment, including a light source and a light blade body.
FIG. 2 is a diagrammatic view of the light source and an in-coupling portion of the light blade body of FIG. 1.
FIG. 3 is a diagrammatic view of a propagating portion of the light blade body of FIG. 1 comprising mixing optics, in an embodiment.
FIG. 4 is a diagrammatic view of an out-coupling portion of the light blade body of FIG. 1.
Figure 11:
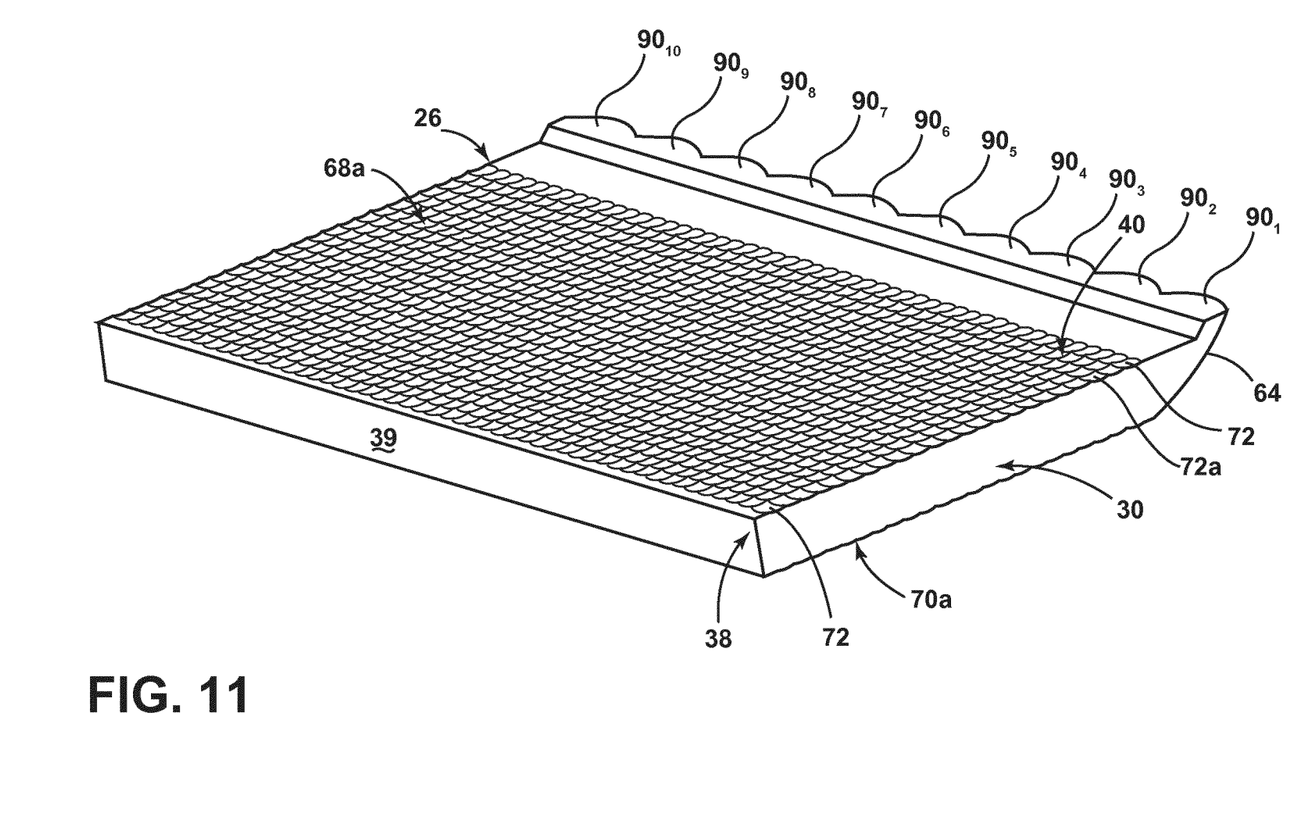
FIG. 11 is an isometric view of the light blade body of FIG. 1, in an embodiment.

Referring now to the drawings wherein like reference numerals are used to identify identical or similar components in the various views, FIG. 1 is a diagrammatic view of a lighting device 20 in accordance with an embodiment. The lighting device 20 includes a light source 22 generating source light beams 24 and a light blade body 26. The light blade body 26 is configured to collect the light from the light source 22 and guide the light to an exterior surface 39 (FIG. 4) of the light blade body 26, where the light is emitted in a desired, first direction 54. FIG. 11 is an isometric view of the light blade body 26 of FIG. 1.

With continued reference to FIGS. 1 and 11, the light blade body 26 includes an in-coupling portion 28, a light propagating portion 30, and an out-coupling portion 38. In an embodiment, the light blade body 26 may be generally rectangular in shape and of unitary construction, and may comprise light transmissive material, such as acrylic or polycarbonate, polyarylate, glass, or polyoxymethylene to mention a few alternatives.

The light blade body 26 may be formed in conventional ways known in the art, such as by a single shot injection molding process. From a manufacturing point of view, the single shot molding process can result in reduced cycle times, material, and machine footprint. Additionally, the unitary construction simplifies the assembly process due to the reduction of the number of components required to be assembled. Further, the unitary construction also reduces and/or eliminates the need to maintain dimensional tolerances of and between various component parts, thereby resulting in a more robust design.

Figure 15:
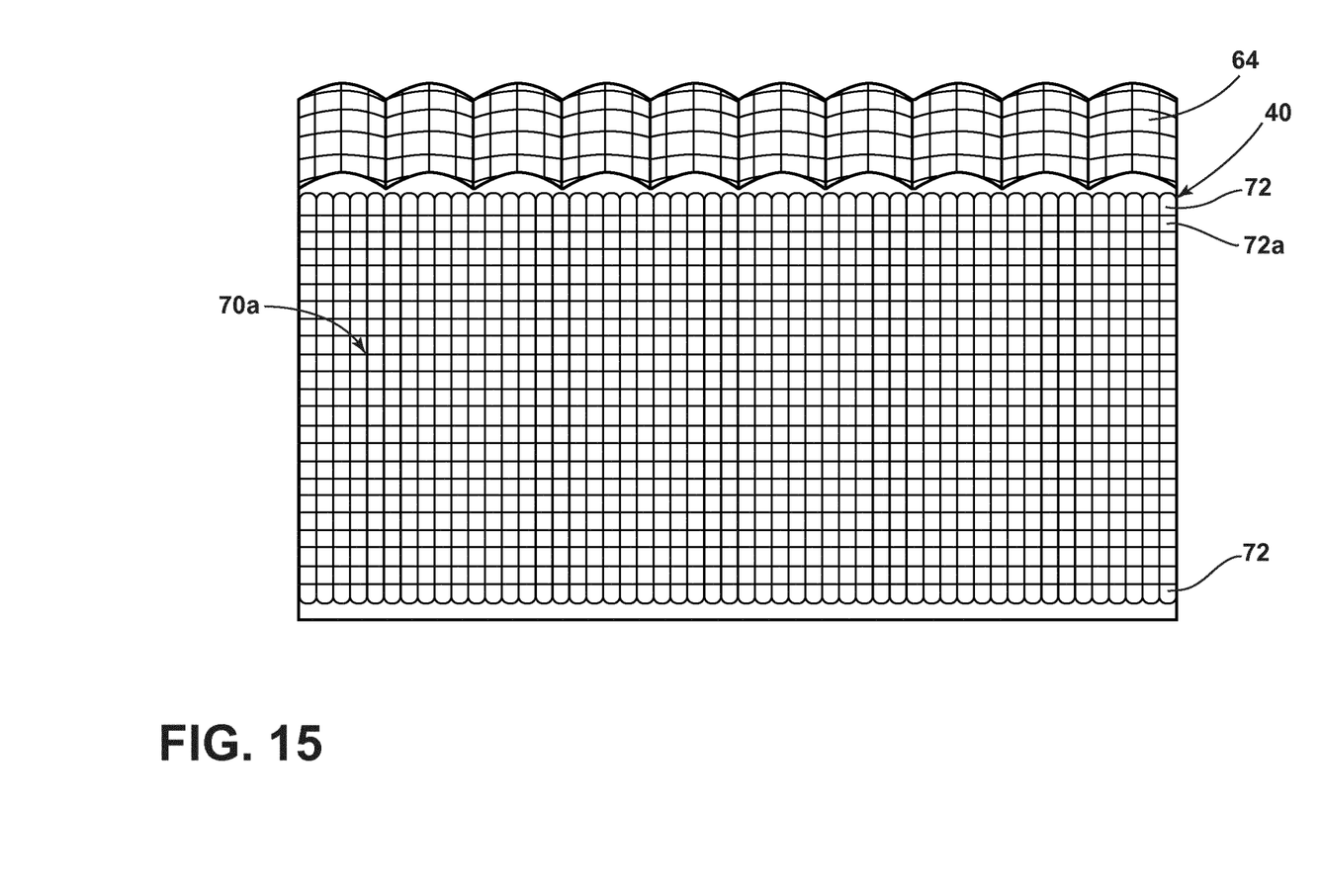
FIG. 15 is a bottom view of the light blade body of FIG. 11, in an embodiment.
Figure 16:
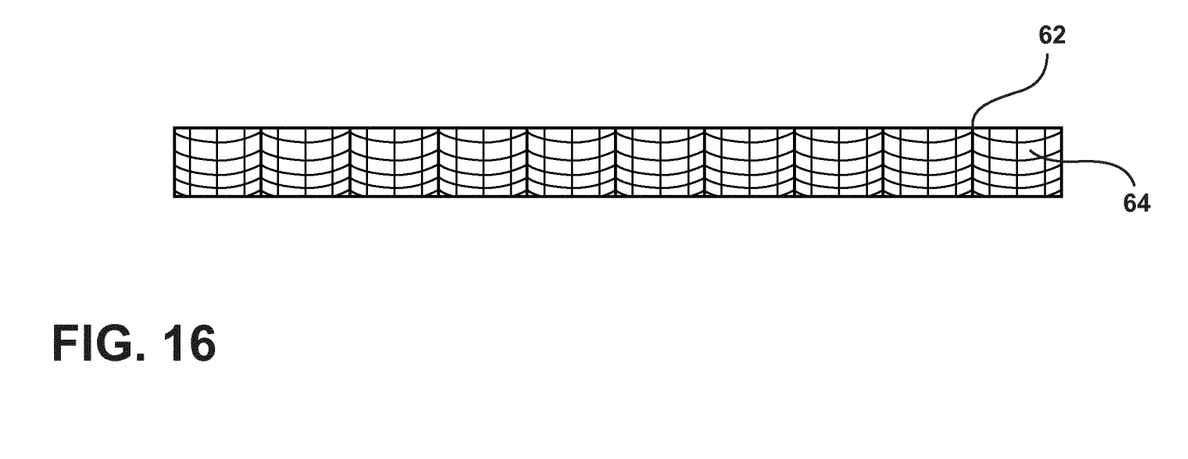
FIG. 16 is a rear view of the light blade body of FIG. 11, in an embodiment.

With reference to FIGS. 1 and 11, the in-coupling portion 28 is optically coupled to the light source 22 and is configured to collect the source light beams that are output from the light source 22 and direct them as first light beams $24_1$. The propagating portion 30 extends along a longitudinal axis 32 between a proximal end 34 and a distal end 36. The propagating portion 30 is configured to receive the first light beams $24_1$ from the in-coupling portion 28 at the proximal end 34 thereof and then guide them to the distal end 36 thereof. As described herein, the propagating portion 30 includes mixing optics 40 (best shown in FIGS. 11 and 15) integral therewith that is configured to mix (e.g., by dispersion) the first light beams $24_1$ to produce second, mixed light beams $24_2$ as the light travels through propagating portion 30 exhibiting improved light intensity uniformity/homogeneity. The out-coupling portion 38 is configured to receive the second light beams $24_2$ from the propagating section 30 and then to emit, in a first direction 54, the second light beams $24_2$ by way of a light emitting area or surface 39.

FIG. 2 is a diagrammatic view of the light source 22 and the in-coupling portion 28. The light source 22 may comprise a circuit board 56 on which is disposed at least one light source such as a light emitting diode (LED) 58 or the like that has a primary direction 60 of light emission directed towards the in-coupling portion 28. In further embodiments, the light source 22 may comprise an incandescent lamp, a high-intensity discharge (HID) lighting element, or a laser. The light source 22 may comprise, in still further embodiments, other conventional lighting sources now known or hereinafter developed, such as organic light-emitting diode (OLED), modular light sources, liquid crystal display (LCD), thin-film transistor (TFT) type LCD, or other display technologies. In the illustrated embodiment of FIG. 1, the primary direction of light emission (see item 60 in FIGS. 2, 5, & 6) is generally perpendicular to the main longitudinal axis 32 of the lighting device 20.

Figure 5:
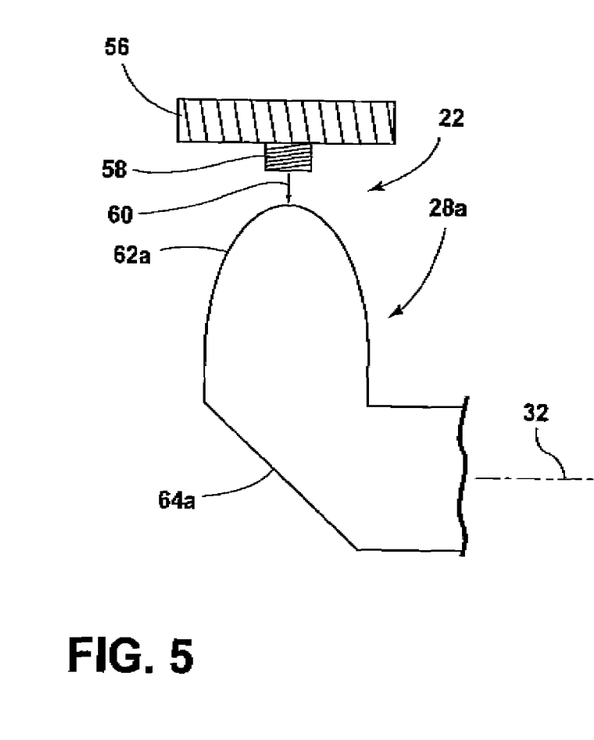
FIGS. 5-6 are diagrammatic views of first and second alternate embodiments of the in-coupling portion of FIG. 1.

The in-coupling portion 28 includes a geometry configured to collect the light output or otherwise emitted from the light source 22 and guide the collected light in the first direction 54 along the longitudinal axis 32 toward the propagating portion 30. The in-coupling portion 28 can be of different geometries (i.e., angled to the propagating section as shown in FIGS. 2 and 5 or aligned as in FIG. 6). As shown in FIG. 2, the in-coupling portion 28 may comprise a generally elbow-shaped optical structure including a planar land 62 to collect source light beams 24 (i.e., the light source 22 faces the planar land 62). The in-coupling portion 28 further includes a curved surface 64, for example having a radiused or other curved shape and configured (e.g., in surface finish, such as highly polished surface or coated with a reflective film, or in other ways) to direct/reflect the collected light toward the propagating portion 30 as first light beams $24_1$. The planar land 62 is configured to permit light to enter into the in-coupling portion 28, while the curved outer surface 64 is configured to inhibit light from emerging from the in-coupling portion 28 and to direct such light toward propagating portion 30. In-coupling portion 28 further includes an inclined surface 63.

The surface/land 62 can be finished in conventional ways known in the art so as to allow the light from the light source to be coupled into the in-coupling portion 28 and such that light does not escape. In an embodiment, depending on the efficiency desired, the surface/land 62 can be highly polished, textured, stippled, ribbed, or laser etched.

FIG. 3 is a diagrammatic view of the propagating portion 30 of the light blade body 26, which may comprise a generally rectangular plate. As described above, the propagating portion 30 is configured to receive light from the in-coupling portion 28 at the proximal end 34 as first light beams $24_1$ and allow this light to be mixed while propagating towards the distal end 36. As shown, the second, mixed light beams $24_2$ are produced by virtue of the mixing optics 40. In an illustrated embodiment, where the light blade body 26 is unitary, the continuous nature of the optical material used in light blade body 26 allows the first light beams $24_1$ from the in-coupling portion 28 to pass and enter the proximal end 34 and propagate to the distal end 36. The top surface 68, the bottom surface 70, and both of the side surfaces that define the exterior surfaces of the propagating portion 30 are configured so as to inhibit light emerging from the interior of the propagating portion 30.

In an embodiment, the exterior surfaces of the propagating portion 30 may be treated so as to limit light from escaping, for example, preferably, by preparing such exterior surfaces so as to have a highly polished material/finish. Alternatively, to limit light from escaping, the exterior surfaces of the propagating portion 30 may be coated with a special coating(s), such as metallic and/or polymeric coatings. In addition, as will be described below one or both of the top and bottom surfaces 68, 70 may incorporate the mixing optics 40. In addition, the cross-sectional area of the propagating portion 30, which in the illustrated rectangular-shape embodiment, is defined by a height 66 and a width 74 (best shown in FIG. 14).

FIG. 4 is a diagrammatic view of the out-coupling portion 38 of the light blade body 26. The out-coupling portion 38 is generally proximate to the distal end 36 of the propagating portion 30. The out-coupling portion 38 is configured to provide a light emitting area/surface 39 for emitting the second, mixed light beams $24_2$. The exterior surface 39 may comprise various approaches known in the art configured to permit light to be emitted therefrom. For example, the exterior surface 39 may comprise a predetermined light emitting arrangement selected from the group comprising one or more lenses, micro-optics, and textures, printed structures, and/or coatings and the like in order to modify the appearance and/or the light distribution. In an embodiment, the exterior surface 39—as an emitting surface—is configured to allow the efficient emission of light. In this regard, the exterior surface 39 may be prepared in any of several ways known in the art for this purpose, such as by being highly polished, textured, stippled, ribbed, laser etched, or the like.

FIG. 5 is a diagrammatic view of a first alternate embodiment of the in-coupling portion, designated 28a, which comprises a convex-shaped optical structure, similar to the elbow-shaped optical element in FIGS. 1-2. The in-coupling portion 28a includes a convex-shaped optical element with surface 62a which is disposed relative to the light source 22, such that the primary direction 60 of light emission from the light source 22 is substantially perpendicular to the main longitudinal axis 32. The optical element with surface 62a is configured to include a reflective surface 64a configured to reflect the light emitted in the primary direction 60 from the source 22. The source light beams 24, after reflection, then travel generally in the first direction 54 along the main axis 32 as first light beams $24_1$ (best shown in FIG. 1). The optical element with surface 62a may comprise conventional construction approaches to achieve this function, such as by suitable selection of an optical construction and/or materials and/or finishes for the reflective surface 64a.

The in-coupling portion 28a may include a recessed element (not shown) at the apex thereof, which can include a side wall and top wall, which recessed element enables the light coming from the light source 22 to more efficiently interact with the optical structure. The shape of the element (i.e., the side wall and the top wall) can be, for example only, flat or curved (convex or concave), a symmetric shape or an asymmetric profile. In other embodiments, the in-coupling portion 28a may comprise a light collecting lens element, a total internal reflection (TIR) reflector or other light gathering and directing structures and/or elements known in the art.

Figure 6:
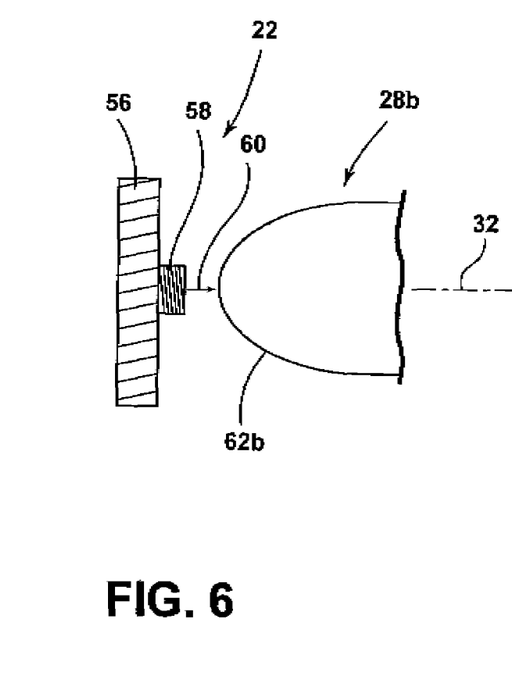

FIG. 6 is a diagrammatic view of a second alternate embodiment of the in-coupling portion designated 28b, which comprises an optical element having a convex surface 62b, which is disposed relative to the light source 22 such that the primary direction 60 of the light emission from the light source 22 is substantially parallel to (aligned) and on axis with the main longitudinal axis 32 (i.e., coincident).

It should be understood that while FIGS. 1-2 and FIGS. 5-6 show the primary direction 60 of light emission to be perpendicular and/or parallel to the main longitudinal axis 32, still other variations are possible. For example, the primary direction 60 of light emission may be angled, for example, between zero (0) degrees and ninety (90) degrees from the main longitudinal axis 32.

FIGS. 7-10 are diagrammatic views of the propagating portion 30 of FIG. 1 having mixing optics 40 in first, second, third, and fourth embodiments.

Figure 7:
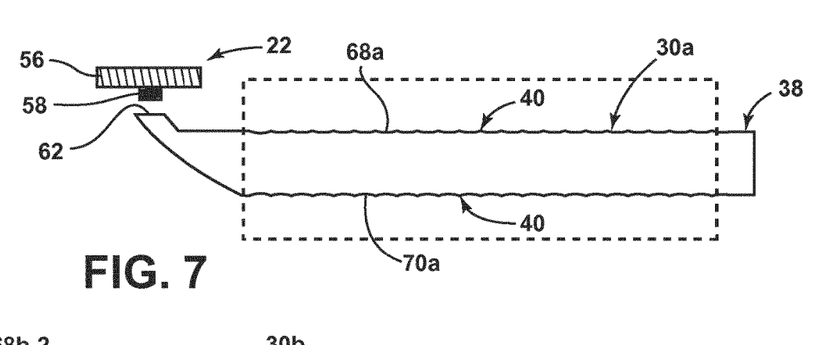
FIG. 7 is a diagrammatic view of the propagating portion of the light blade body of FIGS. 1 and 3, in a first embodiment with the mixing optics along the entirety of top and bottom sides thereof.

FIG. 7 shows propagating portion 30a having mixing optics 40 disposed entirely on top surface 68a and entirely on the bottom surface 70a.

Figure 8:
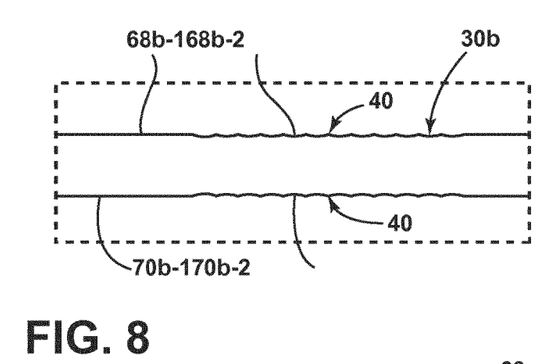
FIG. 8 is a diagrammatic view of the propagating portion of the light blade body of FIGS. 1 and 3, in a second embodiment with the mixing optics along a portion less than the entirety of the top and bottom sides thereof.

FIG. 8 shows propagating portion 30b having mixing optics only on a portion of one or both of the top and bottom surfaces. A first portion of top surface, identified as 68b-1, does not have the mixing optics 40 incorporated therein while a second portion of the top surface, namely 68b-2, does incorporate the mixing optics 40. Additionally and/or alternatively, the bottom surface may likewise be partially configured with mixing optics 40. A first portion of the bottom surface, identified as 70b-1, does not have the mixing optics 40 incorporated therein while the second portion of the bottom surface, namely 70b-2, incorporates mixing optics 40.

Figure 9:
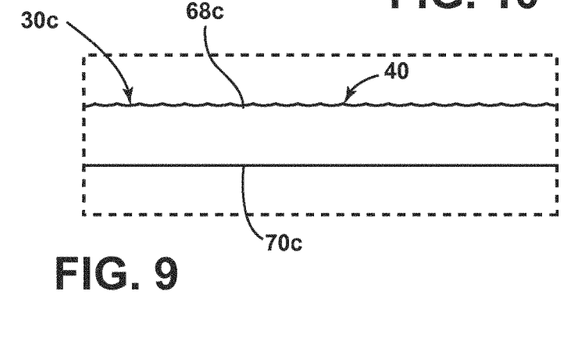
FIG. 9 is a diagrammatic view of the propagating portion of the light blade body of FIGS. 1 and 3, in a third embodiment with the mixing optics on the top side only.

FIG. 9 shows propagating portion 30c having mixing optics 40 disposed entirely on top surface 68c only and not on bottom surface 70c.

Figure 10:
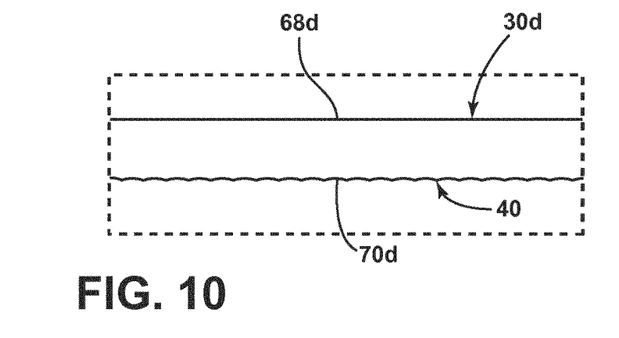
FIG. 10 is a diagrammatic view of the propagating portion of the light blade body of FIGS. 1 and 3, in a fourth embodiment with the mixing optics on the bottom side only.

FIG. 10 shows propagating portion 30d having mixing optics 40 disposed entirely on bottom surface 70d only and not on top surface 68d.

Mixing Optics. FIG. 11 is an isometric view of the light blade body 26 of FIG. 1. As shown, top surface 68a includes mixing optics 40 disposed entirely over top surface 68a. The mixing optics 40 may include, in an embodiment, a plurality of convex, inwardly-facing features 72, 72a. In other words, the convex portion of features face inwardly toward the interior of the light propagating portion 30a. In the illustrated embodiment, the features 72, 72a are arranged in a plurality of rows across the width and columns up and down the length of light blade body 26. Features 72 are disposed on the top and bottom rows while the remainder of features comprise features 72a.

Figure 14:
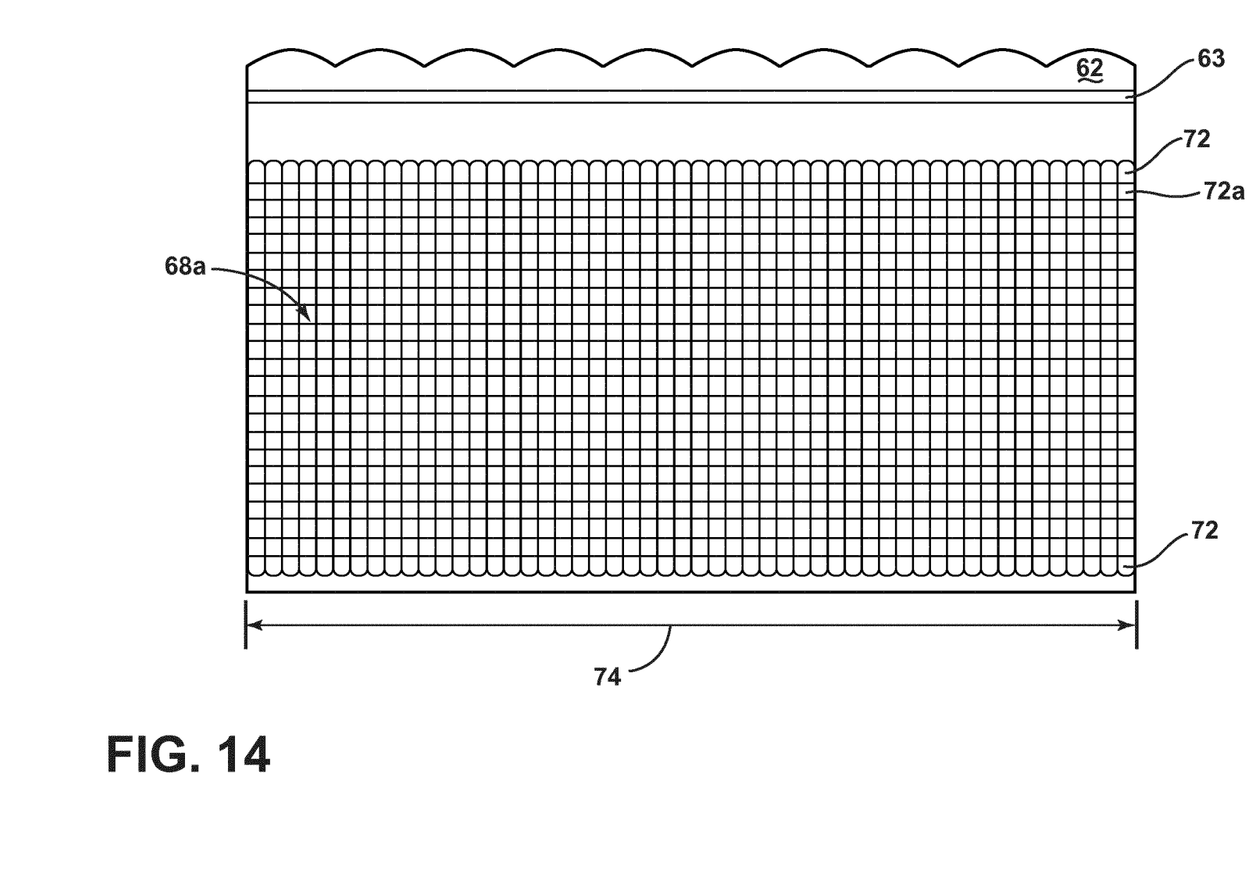
FIG. 14 is a top view of the light blade body of FIG. 11, in an embodiment.

FIG. 14 is a top view of the light blade body 26 of FIG. 11 and shows features 72 as being generally rectangular with a curved end edge while the features 72a are generally rectangular.

With continued reference to FIG. 11, the downwardly-facing apex of the convex features functions to increase the dispersion and thus mixing of the first light beams $24_1$ entering propagating portion 30 to thereby improve light homogeneity. While in the illustrated embodiment, the features 72, 72a are shown as being scallop-shaped features extending into the surfaces 68a, 70a, it should be appreciated that other implementations would be possible. Additionally, since the features 72, 72a are physically formed, the entire light blade body 26 can continue to be formed by way a straightforward single shot molding process as described above, thereby reducing cost and complexity.

The mixing optics 40 of the propagating portion 30 can comprise other types of features similar to and/or even different from features 72, 72a in order to obtain the light mixing function, including but not limited to optical features from the group comprising prismatic, cylindrical, pillows, patterns, micro-optics, the herein described scallop-shaped generally convex features 72, 72a, or printed structures of varying size and shape.

Figure 12:
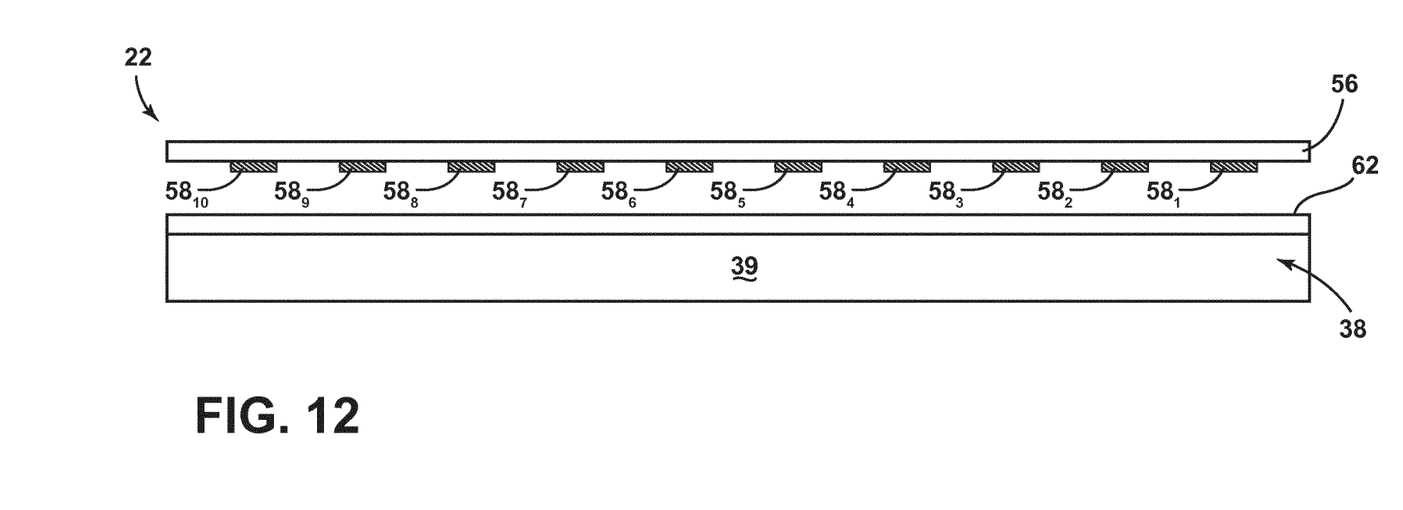
FIG. 12 is a front view of the light blade body of FIG. 11, including a light source in an embodiment.
Figure 13:
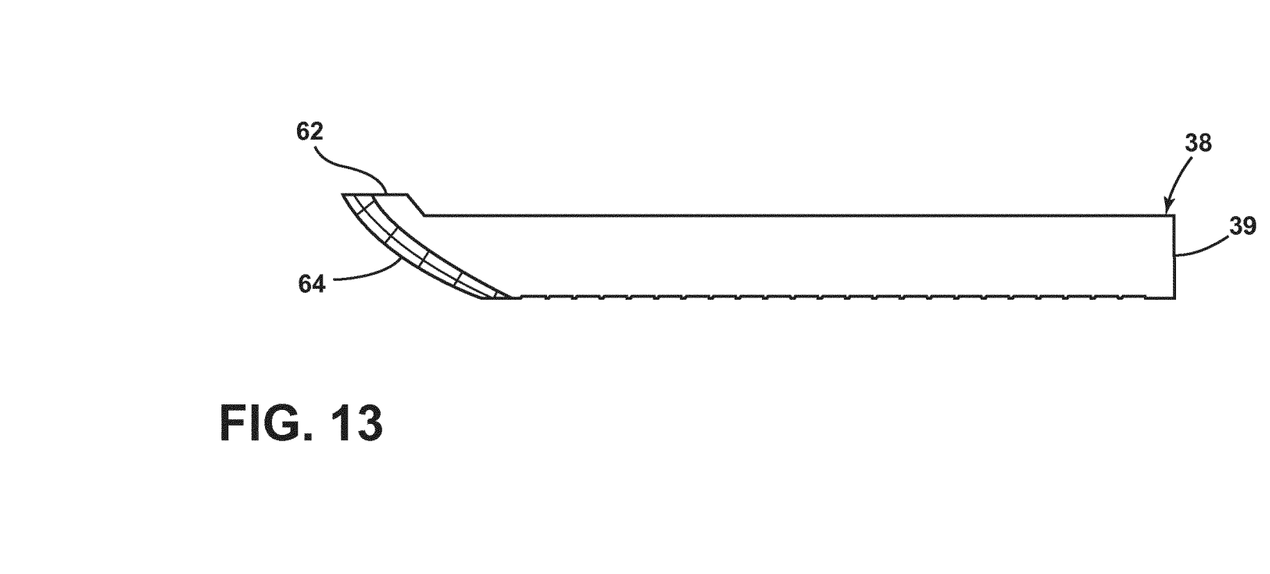
FIG. 13 is a side view of the light blade body of FIG. 11, in an embodiment.

FIG. 12 is a front view of the lighting device showing an exemplary light source 22 in greater detail. In an embodiment, the light source 22 may include the above-mentioned board 56 as well as a plurality of individual lights sources such as a plurality of LEDs, such light sources/LEDs being designated as $58_1$, $58_2$, $58_3$, $58_4$, $58_5$, $58_6$, $58_7$, $58_8$, $58_9$, and $58_{10}$. The light blade body 26 also includes a linear arrangement of a plurality of truncated optical structures, designated $90_1$, $90_2$, $90_3$, $90_4$, $90_5$, $90_6$, $90_7$, $90_8$, $90_9$, and $90_{10}$ (best shown in FIG. 11). Each of the optical structures is generally the same as optical structure described above for the in-coupling portion 28, and includes a respective planar land 62 and curved exterior surface. Adjacent optical structures $90_1$, $90_2$, $90_3$, $90_4$, $90_5$, $90_6$, $90_7$, $90_8$, $90_9$, and $90_{10}$ meet to form separate intervening valleys. Each of the light sources/LED's $58_1$, $58_2$, $58_3$, $58_4$, $58_5$, $58_6$, $58_7$, $58_8$, $58_9$, and $58_{10}$ respectively face a corresponding one of the plurality of optical structures $90_i$ (i=1 to 10) such that a primary direction 60 of light emission from the light sources/LEDs is directed towards the respective optical structures. It should be understood that other light source arrangements can be used. For example only, the light sources can be arranged in a linear pattern, a jigsaw pattern, a matrix pattern or even a module with a remote light source. Through the foregoing, substantially continuous light source can be provided to the in-coupling portion 28, as taken with respect to a direction transverse to the main axis 32.

FIG. 13-16 are side, top, bottom, and rear views, respectively, of the light blade body 26 of FIG. 11.

Operation. Referring now to FIG. 1, in operation, source light beams 24 as collected by in-coupling portion 28 are directed by way of surface 64 (FIG. 2) from a direction 60 to a direction 54, which is in a direction parallel to the main longitudinal axis 32 of the lighting device 20. The light as reflected by surface 64 is indicted as first light beams $24_1$. As light beams $24_1$ enter light propagating portion 30, they impinge on the convex surface(s) presented by the plurality of features 72, 72a and disperse and mix, yielding the second, mixed light beams $24_2$. As shown in FIG. 1, for example, the apex 42 of each feature 72, 72a extends the greatest amount inwardly toward the interior of the propagating portion 30 while a return edge 44 of each feature 72, 72a extends the least amount inwardly toward the interior of the propagating portion 30. As the second, mixed light beams $24_2$ travel in the propagating portion 30 from the proximal end 34 to the distal end 36 and out-coupling portion 38, the second light beams $24_2$ are mixed to an ever greater extent, thereby increasing uniformity and homogeneity, as demonstrated in FIGS. 17-18 below.

Figure 17:
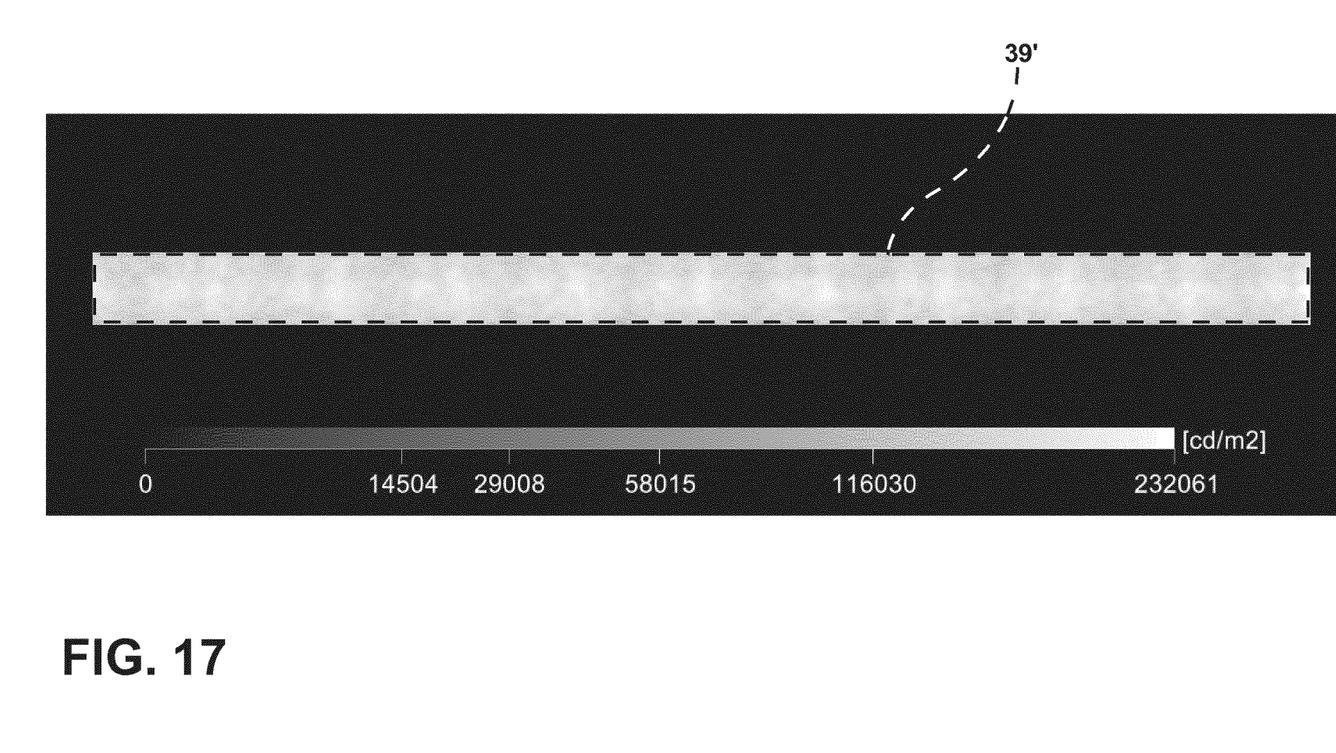
FIG. 17 is a luminance plot of the lighting device of FIG. 1, in an embodiment.

FIG. 17 is a luminance plot of an embodiment of the lighting device 20 consistent with the present teachings. The luminance plot shows the output luminance for the exterior surface 39 of the out-coupling portion 38. For convenience, the corresponding area on the luminance plot is designated 39'. As can be seen, the light intensity is homogeneous across the vertical axis as well as the horizontal axis.

Figure 18:
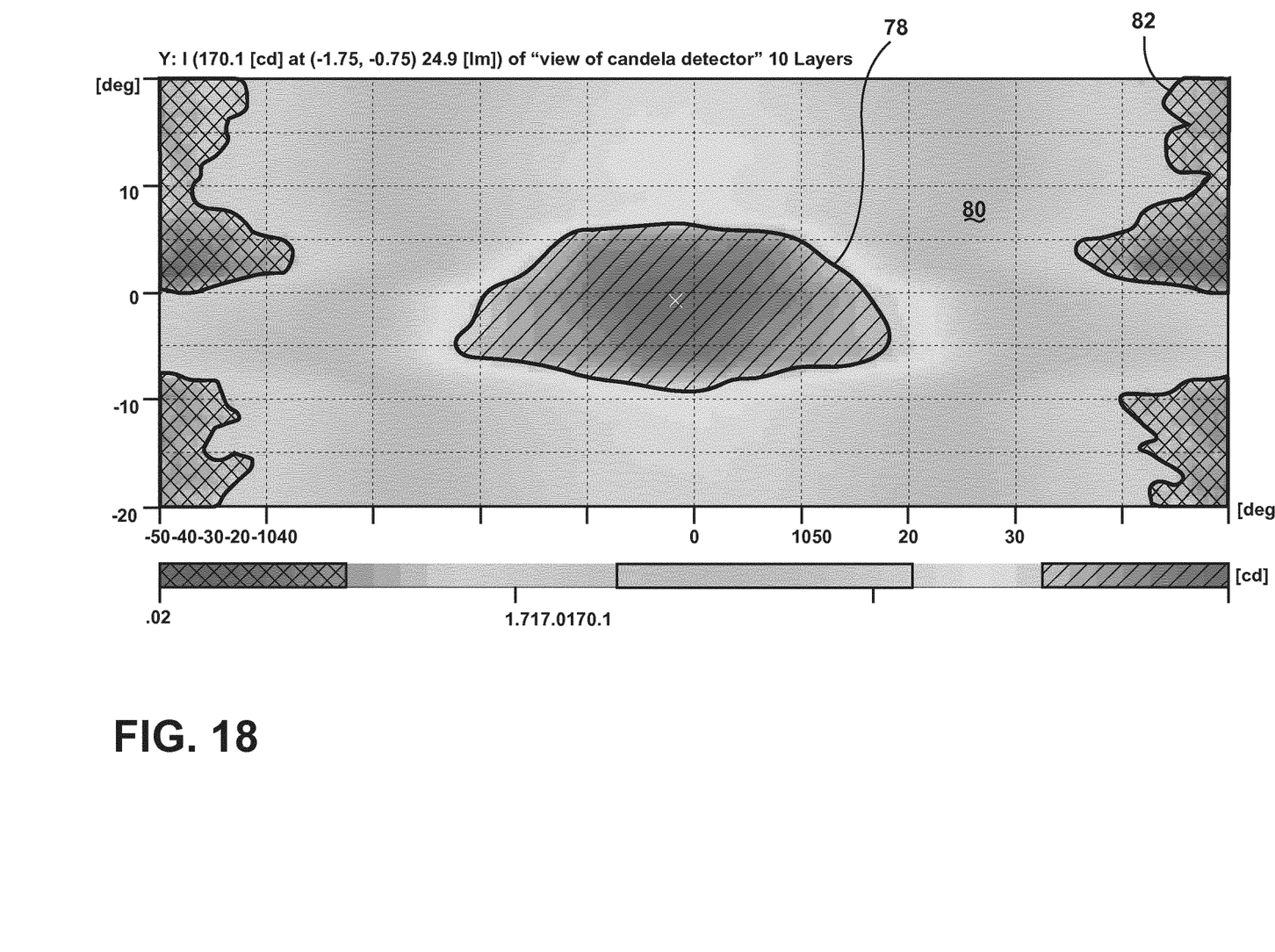
FIG. 18 is a light intensity plot showing light intensity as a function of viewing angle of the lighting device of FIG. 1, in an embodiment.

FIG. 18 is a light intensity plot showing light intensity as a function of on-axis and off-axis measurements, which illustrates the light distribution of an embodiment of the instant teachings. As shown, the X-axis pertains to the number of degrees (horizontal) off of center-axis, while the Y-axis pertains to the number of degrees (vertical) off of center-axis. The plot in FIG. 18 illustrates light uniformity as measured on-axis and as measured progressively off-axis.

A first region 78 shows a first (highest) level of light intensity for substantially on-axis measurement (i.e., the region being roughly between ±20 horizontal degrees and ±10 vertical degrees). A second region 80 shows a second, reduced level of light intensity that extends from the first region 78 and continues to about ±70-80 degrees (horizontal). A third region 82 extends further off-axis (horizontal) from the second region 80. The third region 82 is nearly perpendicular to the exterior face of the lighting device.

Embodiments according to the instant disclosure may comprise a single light-blade/edge-light which avoids the necessity of using extra elements such as lenses or films or special materials (e.g., DF23), which increase the cost and complexity of the final lighting devices. Embodiments according to the instant disclosure can be manufactured simply, for example only such as through a single shot injection molding process thus reducing cycle times, material, machine footprint. Embodiments according to the instant disclosure can simplify the manufacturing process due to a reduction of the number of components required. Embodiments according to the instant disclosure mix light sooner (i.e., earlier in the light path—the propagating portion 30) thereby allowing for a smaller packaging area leading to a reduction in materials/cost. Embodiments according to the instant disclosure can be made using typical molding materials and does not require the higher-priced light diffusing materials, such as DF23.

Achieving a homogeneous light distribution is difficult and normally requires using more LEDs than is required to meet legal or other requirements, expensive light diffusing materials, and/or a longer edge-light which requires more material and space which is not always possible with cost and packaging specifications. The instant teachings describe a method and apparatus that mixes the light sooner and thus creating a more homogenous light distribution without additional light sources, material, or packaging space. The foregoing numerous embodiments solve one or more problems known in the art.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the teachings as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A lighting device, comprising:
   at least one light source configured to output source light beams; and
   a light blade body including,
      an in-coupling portion optically proximate said at least one light source and configured to collect and guide said source light beams as first light beams generally in a first direction along a longitudinal axis;
      a propagating portion extending along said longitudinal axis between a proximal end and a distal end, said propagating portion being configured to receive said first light beams from said in-coupling portion at said proximal end, wherein said propagating portion includes mixing optics configured to increase dispersion and mixing of said first light beams to produce second, mixed light beams and to guide said second, mixed light beams to said distal end, wherein said propagating portion is a rectangular-shaped plate and includes a top surface and a bottom surface, said top surface and said bottom surface being opposite each other and parallel to said longitudinal axis, said mixing optics comprising a plurality of scallop-shaped convex features disposed in rows and columns along an entirety of said top surface and said bottom surface, wherein each of said scallop-shaped convex features include a curved apex facing toward an interior of said propagating portion; and
      an out-coupling surface joined to said distal end of said propagating portion and perpendicular to said longitudinal axis of said propagating portion and configured to receive said second, mixed light beams and to emit said second, mixed light beams in said first direction.

2. The lighting device of claim 1 wherein said at least one light source comprises one of a light-emitting diode (LED), an incandescent lamp, a high-intensity discharge (HID) lighting element, and a laser.

3. The lighting device of claim 1 wherein said light blade body is unitary.

4. The lighting device of claim 1 wherein said in-coupling portion comprises a truncated structure having a planar land and wherein said at least one light source faces said land.

5. The lighting device of claim 1 wherein said at least one light source has a primary direction of emission that is one that is generally perpendicular to said axis, parallel to said axis, or angled relative to said axis.

6. The lighting device of claim 1 wherein said in-coupling portion comprises an elbow-shaped optical element configured to receive said source light beams in a primary direction of emission that is perpendicular to said first direction and guide said source light beams as said first light beams in said first direction generally parallel to said axis.

7. The lighting device of claim 1 wherein said in-coupling portion comprises a convex optical element configured to receive said source light beams in a primary direction of emission that is parallel to said first direction and guide said source light beams as said first light beams in said first direction generally parallel to said axis.

8. The lighting device of claim 1 wherein said in-coupling portion comprises a total internal reflection (TIR) reflector.

9. The lighting device of claim 1 wherein a distribution of said second, mixed light beam emitted from said out-coupling surface portion conforms to predetermined uniformity levels.

10. The lighting device of claim 1 wherein said light blade body comprises a light transmissive material selected from the group comprising acrylic and polycarbonate.

11. The lighting device of claim 1 wherein said in-coupling portion comprises a linear arrangement of a plurality of truncated generally convex structures, and wherein said at least one light source comprises a plurality of lights sources, wherein each of said plurality of light sources face a respective one of said plurality of convex structures.

* * * * *